US012533290B2

(12) United States Patent
Ehrstedt et al.

(10) Patent No.: US 12,533,290 B2
(45) Date of Patent: Jan. 27, 2026

(54) CPR DEVICE WITH PIVOTING SUPPORT ARM

(71) Applicant: Physio-Control, Inc., Redmond, WA (US)

(72) Inventors: Marcus Ehrstedt, Kävlinge (SE); Thomas Falk, Staffenstorp (SE)

(73) Assignee: PHYSIO-CONTROL, INC., Redmond, WA (US)

( * ) Notice: Subject to any disclaimer, the term of this patent is extended or adjusted under 35 U.S.C. 154(b) by 931 days.

(21) Appl. No.: 17/508,765

(22) Filed: Oct. 22, 2021

(65) Prior Publication Data

US 2022/0125675 A1 Apr. 28, 2022

Related U.S. Application Data

(60) Provisional application No. 63/105,738, filed on Oct. 26, 2020.

(51) Int. Cl.
*A61H 31/00* (2006.01)

(52) U.S. Cl.
CPC ......... *A61H 31/006* (2013.01); *A61H 31/008* (2013.01); *A61H 2201/0142* (2013.01); *A61H 2201/0192* (2013.01); *A61H 2201/1619* (2013.01); *A61H 2201/1626* (2013.01); *A61H 2201/1676* (2013.01); *A61H 2203/0456* (2013.01)

(58) Field of Classification Search
CPC .......... A61H 31/006; A61H 2201/0142; A61H 2201/1626; A61H 2201/1676; A61H 2203/0456; A61H 31/008; A61H 2201/0192; A61H 2201/1619; A61H 2201/1623; A61H 2201/1215; A61H 2205/084; A61H 31/004; A61H 31/007; A61H 23/0254; A61H 2011/005; A61H 11/00; A61H 1/00; A61H 2031/003; A61H 2031/001; A61H 2201/1238; A61H 2201/1207; A61H 31/005; A61H 31/00; A61H 2031/002; A61G 1/00–06
See application file for complete search history.

(56) References Cited

U.S. PATENT DOCUMENTS

| | | | | | |
|---|---|---|---|---|---|
| 5,913,837 | A * | 6/1999 | Smith | .................. | A61H 31/008<br>601/134 |
| 5,951,499 | A * | 9/1999 | Saringer | .............. | A61H 1/0274<br>601/5 |
| 10,792,215 | B2 | 10/2020 | Nilsson et al. | | |

(Continued)

FOREIGN PATENT DOCUMENTS

DE 102013114565 B3 * 4/2015 ........... A61H 31/005

OTHER PUBLICATIONS

DE102013114565B3 machine translation accessed Jul. 22, 2024 (Year: 2024).*

*Primary Examiner* — Victoria Murphy
*Assistant Examiner* — Kelsey Rhee
(74) *Attorney, Agent, or Firm* — Miller Nash LLP

(57) ABSTRACT

A cardiopulmonary resuscitation ("CPR") device having a chest compression mechanism configured to deliver CPR chest compressions to a patient, the chest compression mechanism having a rigid support arm configured to pivot about a reference line to deliver the CPR chest compressions.

7 Claims, 5 Drawing Sheets

(56) References Cited

U.S. PATENT DOCUMENTS

| | | | | |
|---|---|---|---|---|
| 2009/0234255 | A1 * | 9/2009 | Votel .................... | A61H 31/004 601/41 |
| 2010/0198118 | A1 * | 8/2010 | Itnati .................... | A61H 31/006 601/41 |
| 2014/0005578 | A1 * | 1/2014 | Woerlee ............... | A61H 31/004 601/41 |

* cited by examiner

CPR DEVICE WITH PIVOTING SUPPORT ARM

CROSS-REFERENCES TO RELATED APPLICATIONS

This disclosure claims benefit of U.S. Provisional Application No. 63/105,738, titled "CPR DEVICE WITH PIVOTING SUPPORT ARM," filed on Oct. 26, 2020, which is incorporated herein by reference in its entirety.

TECHNICAL FIELD

This disclosure is directed to devices and methods for CPR machines that deliver CPR chest compressions to a patient.

BACKGROUND

Cardiopulmonary resuscitation (CPR) is a medical procedure performed on patients to maintain some level of circulatory and respiratory functions when patients otherwise have limited or no circulatory and respiratory functions. CPR is generally not a procedure that restarts circulatory and respiratory functions, but can be effective to preserve enough circulatory and respiratory functions for a patient to survive until the patient's own circulatory and respiratory functions are restored. CPR typically includes frequent torso compressions that usually are performed by pushing on or around the patient's sternum while the patient is lying on the patient's back. For example, torso compressions can be performed as at a rate of about 100 compressions per minute and at a depth of about 5 cm per compression for an adult patient. The frequency and depth of compressions can vary based on a number of factors, such as valid CPR guidelines.

Mechanical CPR has several advantages over manual CPR. A person performing CPR, such as a medical first-responder, must exert considerable physical effort to maintain proper compression timing and depth. Over time, fatigue can set in and compressions can become less consistent and less effective. The person performing CPR must also divert mental attention to performing manual CPR properly and may not be able to focus on other tasks that could help the patient. For example, a person performing CPR at a rate of 100 compressions per minute would likely not be able to simultaneously prepare a defibrillator for use to attempt to correct the patient's heart rhythm. Mechanical compression devices can be used with CPR to perform compressions that would otherwise be done manually. Mechanical compression devices can provide advantages such as providing constant, proper compressions for sustained lengths of time without fatiguing, freeing medical personnel to perform other tasks besides CPR compressions, and being usable in smaller spaces than would be required by a person performing CPR compressions.

Configurations of the disclosed technology address shortcomings in existing mechanical compression devices.

DETAILED DESCRIPTION

As described herein, aspects are directed to a cardiopulmonary resuscitation ("CPR") device with pivoting support arm. In example configurations, the pivoting support arm passes over the patient's head and shoulders rather than around the patient's torso and arms as in other devices, such as the mechanical CPR device illustrated in FIGS. 1A and 1B of U.S. Pat. No. 10,792,215. Accordingly, example configurations may permit use of the CPR device on patients whose abdomen, bust, or arms may be too large to use devices that enclose or pass over the patient's torso and arms from the side of the patient. Hence, the device architecture may be less sensitive to patient size, allowing example configurations of the CPR device to be used on a wider range of patient sizes than is presently feasible. Also or instead, in example configurations the pivoting action of the pivoting support arm is what delivers the chest compressions to the patient.

Figure 1:
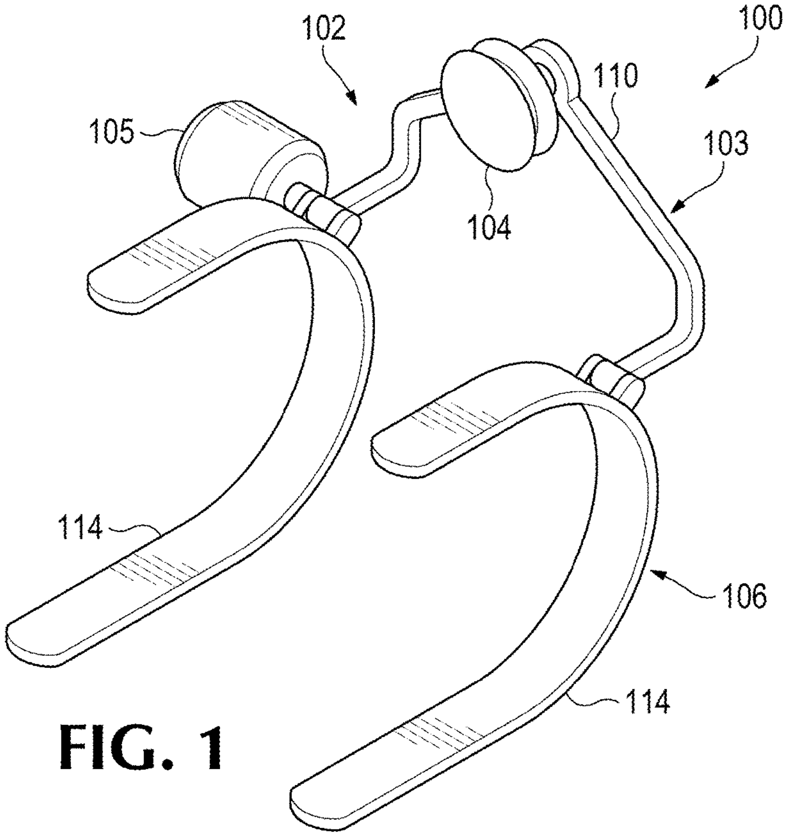
FIG. 1 is an isometric view of a CPR device with pivoting support arm according to a first example configuration, with the support arm illustrated in an example first position.
Figure 2:
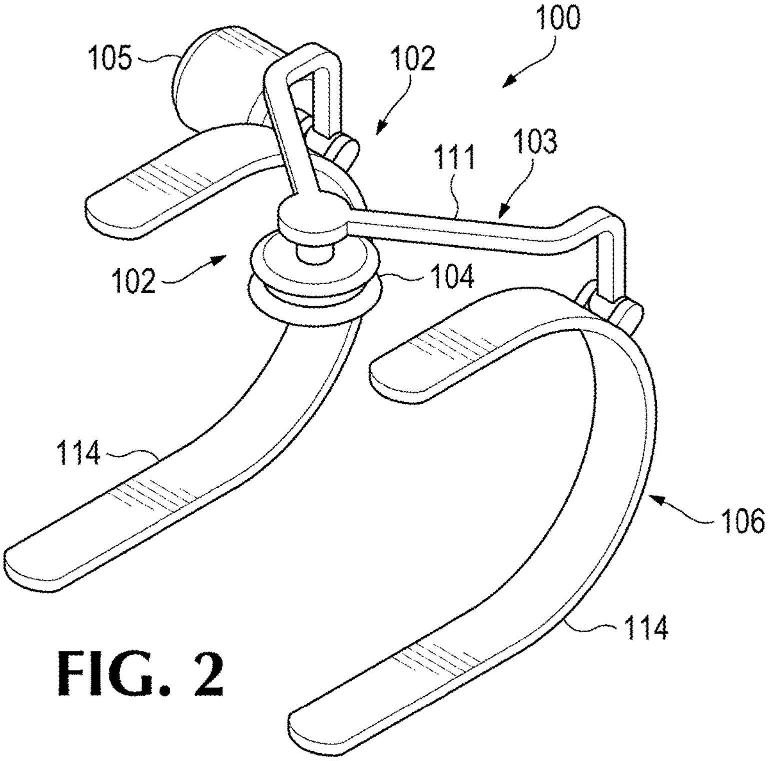
FIG. 2 is an isometric view of the CPR device with pivoting support arm of FIG. 1, with the support arm illustrated in an example second position.
Figure 3:
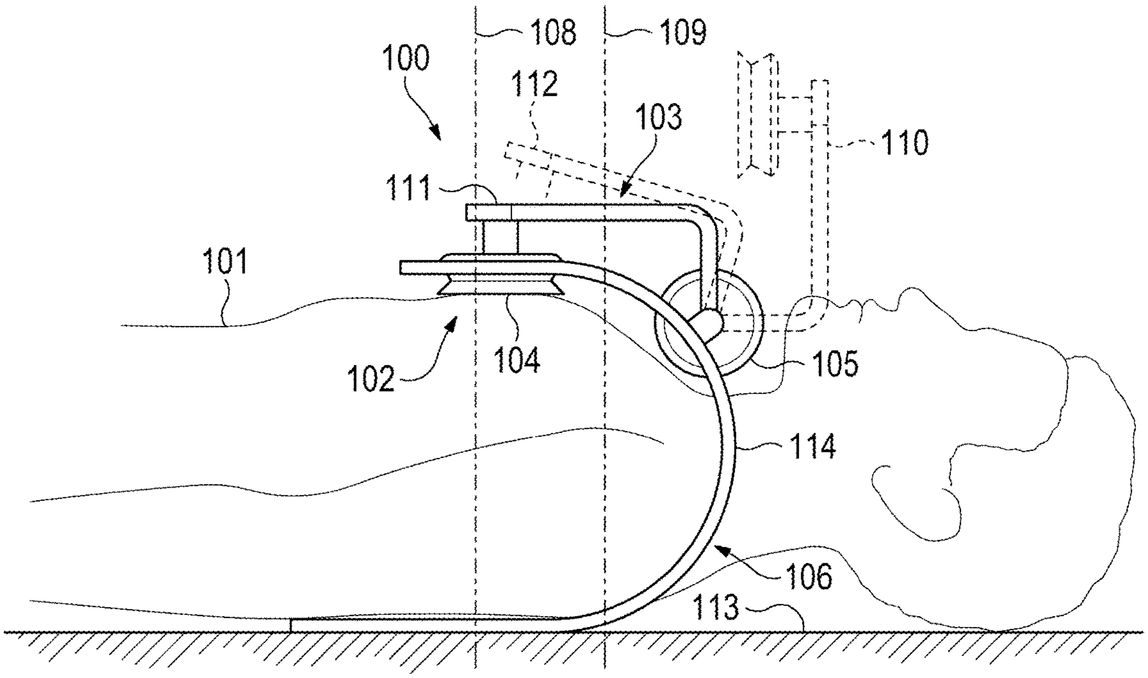
FIG. 3 is a side view of the CPR device with pivoting support arm of FIG. 1, with the support arm illustrated in the example first position, in the example second position, and in an example third position, and also showing an example implementation of CPR device with pivoting support arm on a patient.
Figure 4:
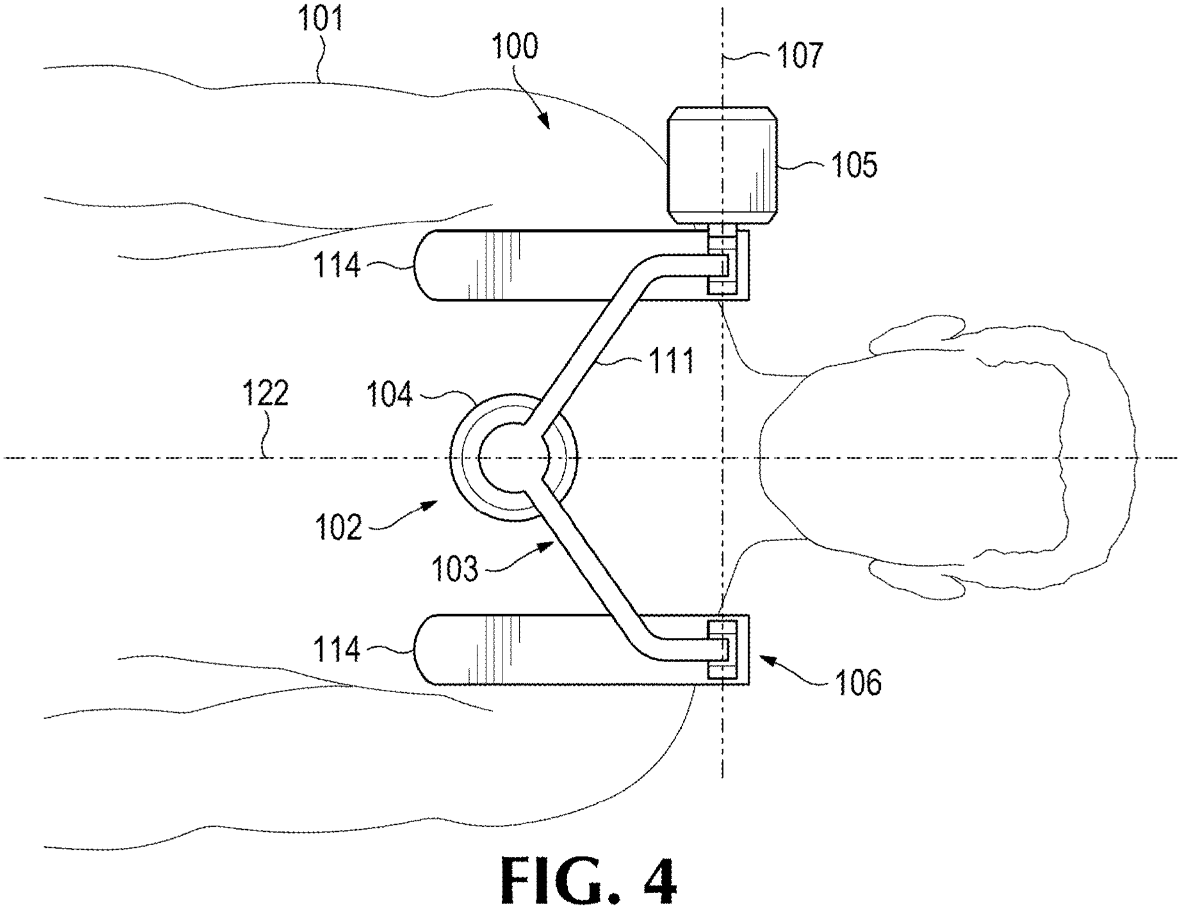
FIG. 4 is a top view of the CPR device with pivoting support arm of FIG. 2.

FIG. 1 is an isometric view of a CPR device with a pivoting support arm according to a first example configuration, with the support arm illustrated in an example first position. FIG. 2 is an isometric view of the CPR device of FIG. 1, with the support arm illustrated in an example second position. FIG. 3 is a side view of the CPR device of FIG. 1, also showing an example implementation of the CPR device with a pivoting support arm on a patient. In FIG. 3, the support arm is illustrated in an example first position (in broken lines), in an example second position (in solid lines), and also in an example third position (also in broken lines). FIG. 4 is a top view of the CPR device of FIG. 2.

As illustrated in FIGS. 1-4, a CPR device 100 with pivoting support may include a chest compression mechanism 102 that is configured to deliver CPR chest compressions to a patient 101. The chest compression mechanism 102 may include a rigid support arm 103, a chest portion 104, and a pivot actuator 105. The CPR device 100 may further include a base member 106.

The support arm 103 may be configured to pivot about a reference line 107 to deliver the CPR chest compressions to the patient 101. The support arm 103 may also be configured to position the chest portion 104 to contact the patient's chest.

The reference line 107 is an imaginary line about which the support arm 103 pivots. As illustrated in FIGS. 1-4, the reference line 107 is between the patient's sternum and the patient's chin. In some example configurations, the reference line 107 may be closer to or farther from the patient's sternum than what is illustrated in FIGS. 1-4. In some example configurations, the reference line 107 may be beyond the patient's sternum. As used in this disclosure, "beyond the patient's sternum" means a region bounded by an imaginary plane 108 running through the patient's sternum (see FIG. 3) and extending away from the imaginary plane 108 in the direction of the patient's head. In some example configurations, the reference line 107 may be beyond the patient's shoulders. As used in this disclosure, "beyond the patient's shoulders" means a region bounded by an imaginary plane 109 running through the patient's shoulder joints (see FIG. 3) and extending away from the imaginary plane 109 in the direction of the patient's head. In some example configurations, the reference line 107 may be substantially perpendicular to an imaginary longitudinal centerline 122 of the patient. As used in this disclosure, "substantially perpendicular" means largely or essentially at right angles, without requiring perfect perpendicularity.

The chest portion 104 may be coupled to the support arm 103 and is configured to contact patient's chest at or near the patient's sternum to deliver the CPR chest compressions.

The pivot actuator 105 may be coupled to the support arm 103. The pivot actuator 105 is configured to pivot the support arm 103 about the reference line 107 to deliver the CPR chest compressions. In an example configuration, the pivot actuator 105 comprises a rotational actuator. The pivot actuator 105 may be coupled to one or both sides of the support arm 103. In versions, there may be a pivot actuator 105 at each location where the support arm 103 intersects the reference line 107.

The pivot actuator 105 may include or be coupled to a controller 123. The controller 123, as will be discussed in more detail below, may provide instructions to the pivot actuator 105 to pivot the support arm 103 about the reference line 107 to deliver the CPR chest compressions.

Figure 9:
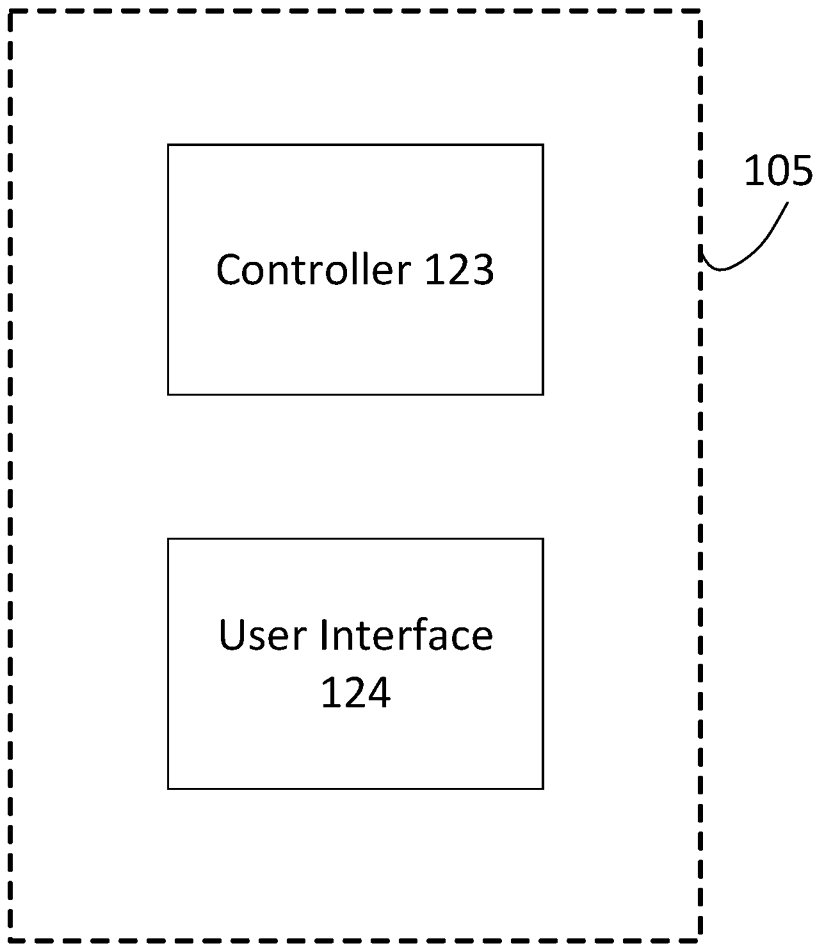
FIG. 9 illustrates the functional relationship between example electronic components of a CPR device with pivoting support arm, according to configurations.

FIG. 9 illustrates the functional relationship between example electronic components of a CPR device with pivoting support arm, according to configurations. The controller 123 may include a processor, which may be implemented as any processing circuitry, such as, but not limited to, a microprocessor, an application specific integration circuit (ASIC), programmable logic circuits, etc. The controller 123 may further include a memory coupled with the processor. The memory can include a non-transitory storage medium that includes programs configured to be read by the processor and be executed upon reading. The processor may be configured to execute instructions from the memory and may perform any methods and/or associated operations indicated by such instructions. The memory may be implemented as processor cache, random access memory (RAM), read only memory (ROM), solid state memory, hard disk drive(s), and/or any other memory type. The memory acts as a medium for storing data, such as instructions for the pivot actuator 105, computer program products, and other instructions.

The controller 123 may be located separately from the pivot actuator 105 and may communicate with the pivot actuator 105 through a wired or wireless connection. The controller 123 may also electrically communicate with a user interface 124. As will be understood by one skilled in the art, the controller 123 may also be in electronic communication with a variety of other devices, such as, but not limited to, a communication device, another medical device, etc.

Returning to FIGS. 1-4, operations of the pivot actuator 105 may be effectuated through the user interface 124 in some examples. The user interface 124 may be external to or integrated with a display. For example, in some examples, the user interface 124 may include physical buttons located on the pivot actuator 105, while in other examples, the user interface 124 may be a touch-sensitive feature of a display. The user interface 124 may be located on the CPR device, or it may be located on a remote device, such as a smartphone, tablet, PDA, and the like, and is also in electronic communication with the controller 123.

The base member 106 may be pivotally coupled to the support arm 103. In an example configuration, the base member 106 is pivotally coupled to the support arm 103 at a location coinciding with the reference line 107. As examples, the base member 106 may be coupled to the support arm 103 through a hinge, socket, or other joint or mechanical bearing. In example configurations, the base member 106 may be a shoulder harness 114, such as the example shoulder harness 114 illustrated in FIGS. 1-4. Other examples are described below for FIGS. 6 and 8.

The example first position 110 illustrated in FIGS. 1 and 3 is an example of the support arm 103 in an upward position, in which the support arm 103 is not positioned to contact the patient's chest to deliver a CPR chest compression to the patient 101. The example second position 111 illustrated in FIGS. 2-4 is an example of the support arm 103 in a downward position, in which the support arm 103 is positioned to contact the patient's chest to deliver a CPR chest compression to the patient 101. To repeatedly deliver CPR chest compression to the patient 101 the support arm 103 may repeatedly move between an upward position, such as the example first position 110 illustrated in FIG. 1, and a downward position, such as the example second position 111 illustrated in FIG. 2, the movement being driven by the pivot actuator 105.

In versions, the upward position need not be as distant from the downward position as what is shown in FIGS. 1-2. Rather, as best shown in FIG. 3, the upward position may be much closer arcuately to the downward position, such as shown in the example third position 112 illustrated in FIG. 3 relative to the second position 111 illustrated in FIG. 3.

To use the example configuration of the CPR device 100 illustrated in FIGS. 1-4, the user may place the patient 101 in the approximate position shown in FIGS. 3 and 4, with the patient 101 lying face up on a support surface 113. While positioning the patient 101, the support arm 103 may be in the first position 110 illustrated in FIG. 3. Once the patient 101 is positioned, the support arm 103 may be lowered to the second position 111 illustrated in FIG. 3, and the pivot actuator 105 may be activated to begin CPR chest compressions. During CPR chest compressions, the support arm 103 may oscillate between the second position 111 and the third position 112, for example.

Figure 5:
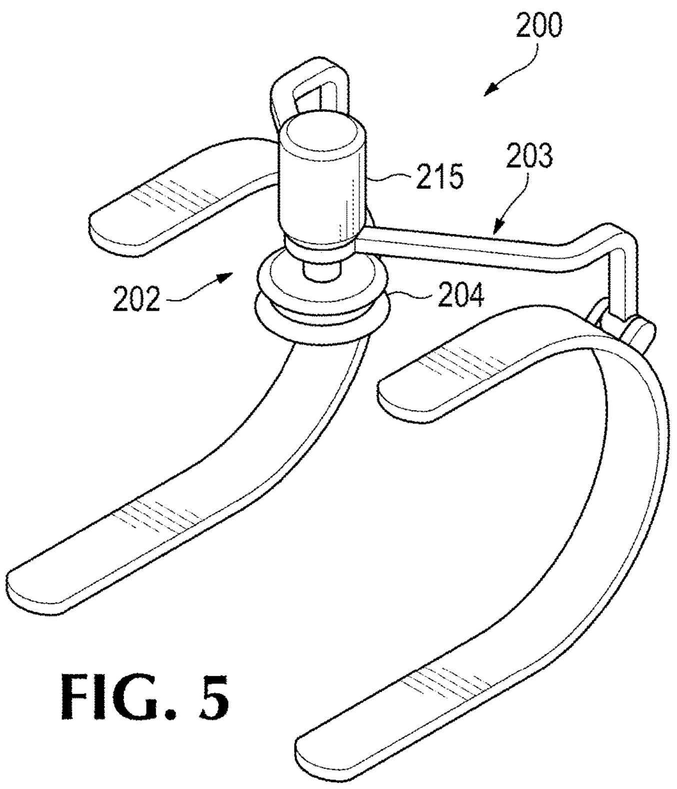
FIG. 5 is an isometric view of a CPR device with pivoting support arm according to a second example configuration.

FIG. 5 is an isometric view of a CPR device with pivoting support arm according to a second example configuration. As illustrated in FIG. 5, the CPR device 200 may include a chest compression member 202 and a rigid support arm 203.

The chest compression member 202 is configured to deliver CPR chest compressions to a patient. The support arm 203 may be configured to position and support the chest compression member 202 over the patient. Similar to what is described above for FIGS. 1-4, the support arm 203 may be further configured to pivot about a reference line that is beyond the patient's sternum to position the chest compression member 202 over the patient. Likewise, in some example configurations, the support arm 203 may be configured to pivot about a reference line that is substantially perpendicular to an imaginary longitudinal centerline 122 of the patient (see FIG. 4).

Accordingly, the CPR device 200 of FIG. 5 may be substantially the same as the CPR device 100 of FIGS. 1-4 except as noted here. Specifically, the chest compression member 202 of FIG. 5 may include a linear actuator 215, such as a piston, to deliver the CPR chest compressions to a patient. The linear actuator 215 may be in addition to or instead of the pivot actuator 105 for the CPR device 100 of FIGS. 1-4. The linear actuator 215 may, for example, directly drive a chest contact member 204 in a reciprocating manner.

The controller 123, as discussed above for the pivot actuator 105 of FIGS. 1-4, may analogously provide instructions to the linear actuator 215 to deliver the CPR chest compressions.

The CPR device 200 of FIG. 5 may be used in substantially the same manner as the CPR device 100 of FIGS. 1-4 except that the linear actuator 215 may be activated instead of or in addition to the pivot actuator 105 to deliver the CPR chest compressions to the patient.

Figure 6:
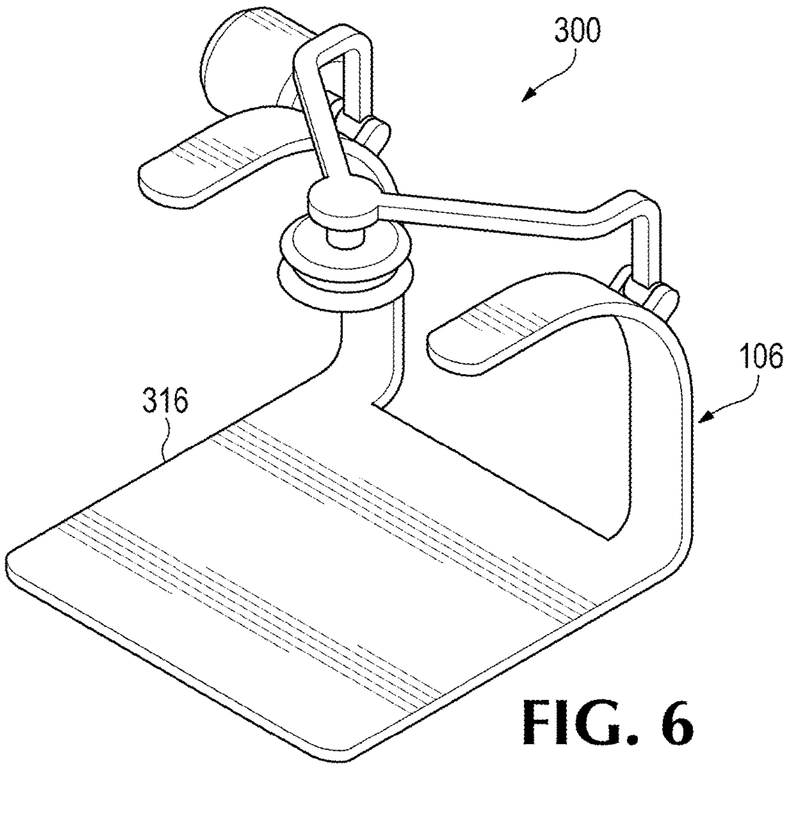
FIG. 6 is an isometric view of a CPR device with pivoting support arm according to a third example configuration.

FIG. 6 is an isometric view of a CPR device with pivoting support arm according to a third example configuration. The CPR device 300 of FIG. 6 is substantially the same as the CPR device 100 of FIGS. 1-4 except as noted here. As illustrated in FIG. 6, the base member 106 may comprise a back plate 316 configured to rest between a support surface 113 (see FIG. 3) and the patient's back while the patient is lying face up on the support surface 113. The back plate 316 may be instead of or in addition to the harness 114 of FIGS. 1-4.

Figure 7:
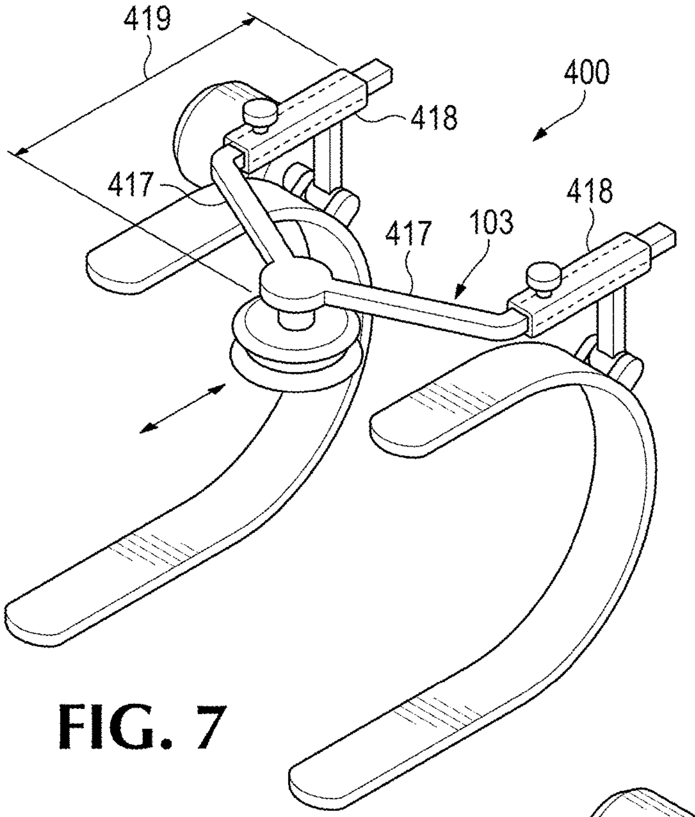
FIG. 7 is an isometric view of a CPR device with pivoting support arm according to a fourth example configuration.

FIG. 7 is an isometric view of a CPR device with pivoting support arm according to a fourth example configuration. The CPR device 400 of FIG. 7 is substantially the same as the CPR device 100 of FIGS. 1-4 except as noted here. As illustrated in FIG. 7, the support arm 103 may include a first segment 417 configured to slide within a second segment 418 of the support arm 103 to alter an overall length 419 of the support arm 103 in a telescoping manner.

Figure 8:
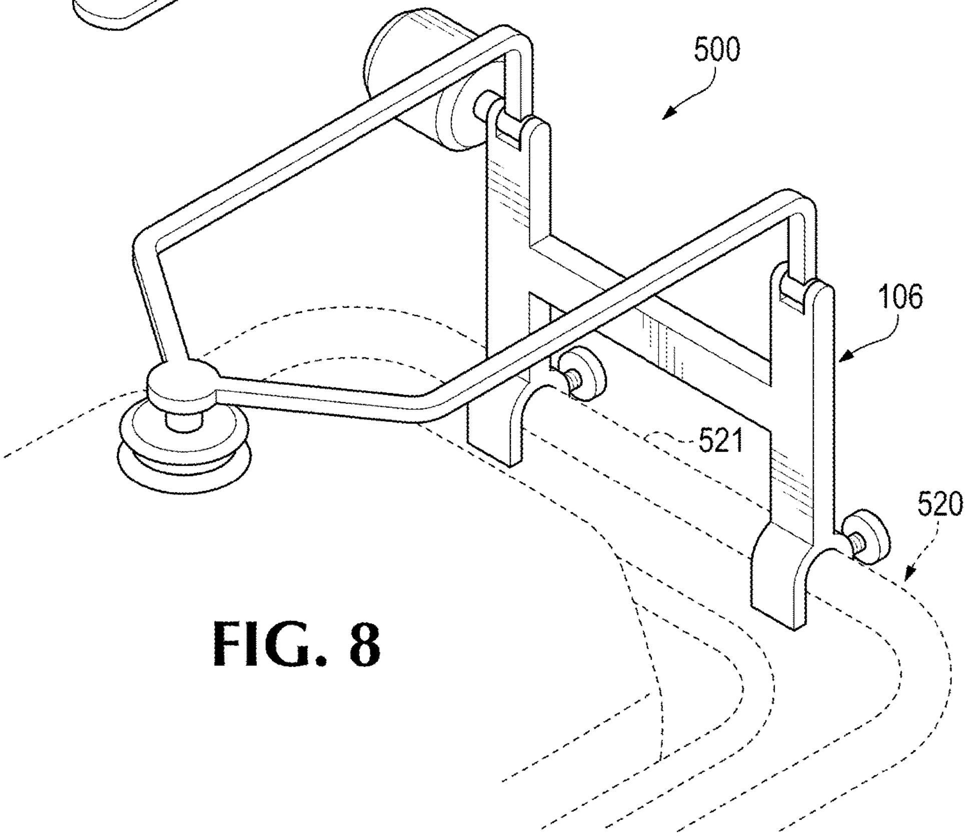
FIG. 8 is an isometric view of a CPR device with pivoting support arm according to a fifth example configuration.

FIG. 8 is an isometric view of a CPR device with pivoting support arm according to a fifth example configuration. The CPR device 500 of FIG. 8 is substantially the same as the CPR device 100 of FIGS. 1-4 except as noted here. As illustrated in FIG. 8, the base member 106 may comprise or be coupled to a bed 520, such as a medical cot or gurney, configured to support the patient while the patient is lying face up. In an example configuration, the base member 106 may comprise or be coupled to a railing 521 of the bed 520. The CPR device 100 of FIG. 8 may be coupled to, or integrated with, the bed 520.

EXAMPLES

Illustrative examples of the disclosed technologies are provided below. A particular configuration of the technologies may include one or more, and any combination of, the examples described below.

Example 1 includes a cardiopulmonary resuscitation ("CPR") device comprising a chest compression mechanism configured to deliver CPR chest compressions to a patient, the chest compression mechanism comprising a rigid support arm configured to pivot about a reference line to deliver the CPR chest compressions.

Example 2 includes the CPR device of Example 1, the chest compression mechanism further comprising a chest portion coupled to the support arm and configured to contact patient's chest to deliver the CPR chest compressions, the support arm further configured to position the chest portion to contact the patient's chest.

Example 3 includes the CPR device of any of Examples 1-2, the chest compression mechanism further comprising a pivot actuator coupled to the support arm, the pivot actuator configured to pivot the support arm about the reference line to deliver the CPR chest compressions.

Example 4 includes the CPR device of Example 3, in which the pivot actuator comprises a rotational actuator.

Example 5 includes the CPR device of any of Examples 1-4, further comprising a base member pivotally coupled to the support arm.

Example 6 includes the CPR device of Example 5, in which the base member comprises a back plate configured to rest between a support surface and the patient's back while the patient is lying face up on the support surface.

Example 7 includes the CPR device of Example 5, in which the base member comprises a bed configured to support the patient while the patient is lying face up.

Example 8 includes the CPR device of Example 7, in which the base member comprises a railing of the bed.

Example 9 includes the CPR device of any of Examples 1-8, in which the support arm includes a first section configured to slide within a second section of the support arm to alter an overall length of the support arm.

Example 10 includes a cardiopulmonary resuscitation ("CPR") device comprising: a chest compression member configured to deliver CPR chest compressions to a patient; and a rigid support arm configured to position and support the chest compression member over the patient, the support arm further configured to pivot about a reference line that is beyond the patient's shoulders to position the chest compression mechanism over the patient.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "up," "upward," "down," and "downward" are used for convenience and in reference to the views provided in figures. But the CPR device may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

We claim:

1. A cardiopulmonary resuscitation ("CPR") device comprising a chest compression mechanism configured to deliver CPR chest compressions to a patient, the chest compression mechanism comprising a rigid support arm configured to pivot about a reference line that is substantially perpendicular to a longitudinal centerline of the patient and on a front side of the patient between the patient's sternum and the patient's chin to deliver the CPR chest compressions, and the chest compression mechanism further comprising a rotational actuator directly coupled to the support arm, the rotational actuator configured to act on the support arm at a location where the support arm intersects the reference line and cause the support arm to pivot about the reference line to deliver the CPR chest compressions.

2. The CPR device of claim 1, the chest compression mechanism further comprising a chest portion coupled to the support arm and configured to contact patient's chest to deliver the CPR chest compressions, the support arm further configured to position the chest portion to contact the patient's chest.

3. The CPR device of claim 1, further comprising a base member pivotally coupled to the support arm.

4. The CPR device of claim 3, in which the base member comprises a back plate configured to rest between a support surface and the patient's back while the patient is lying face up on the support surface.

5. The CPR device of claim 3, in which the base member comprises a bed configured to support the patient while the patient is lying face up.

6. The CPR device of claim 5, in which the base member comprises a railing of the bed.

7. The CPR device of claim 1, in which the support arm includes a first section configured to slide within a second section of the support arm to alter an overall length of the support arm.

* * * * *